W. H. BERRY.
PULVERIZING AND SEPARATING MACHINE.
APPLICATION FILED OCT. 11, 1917.
1,292,686.
Patented Jan. 28, 1919.
5 SHEETS—SHEET 1.
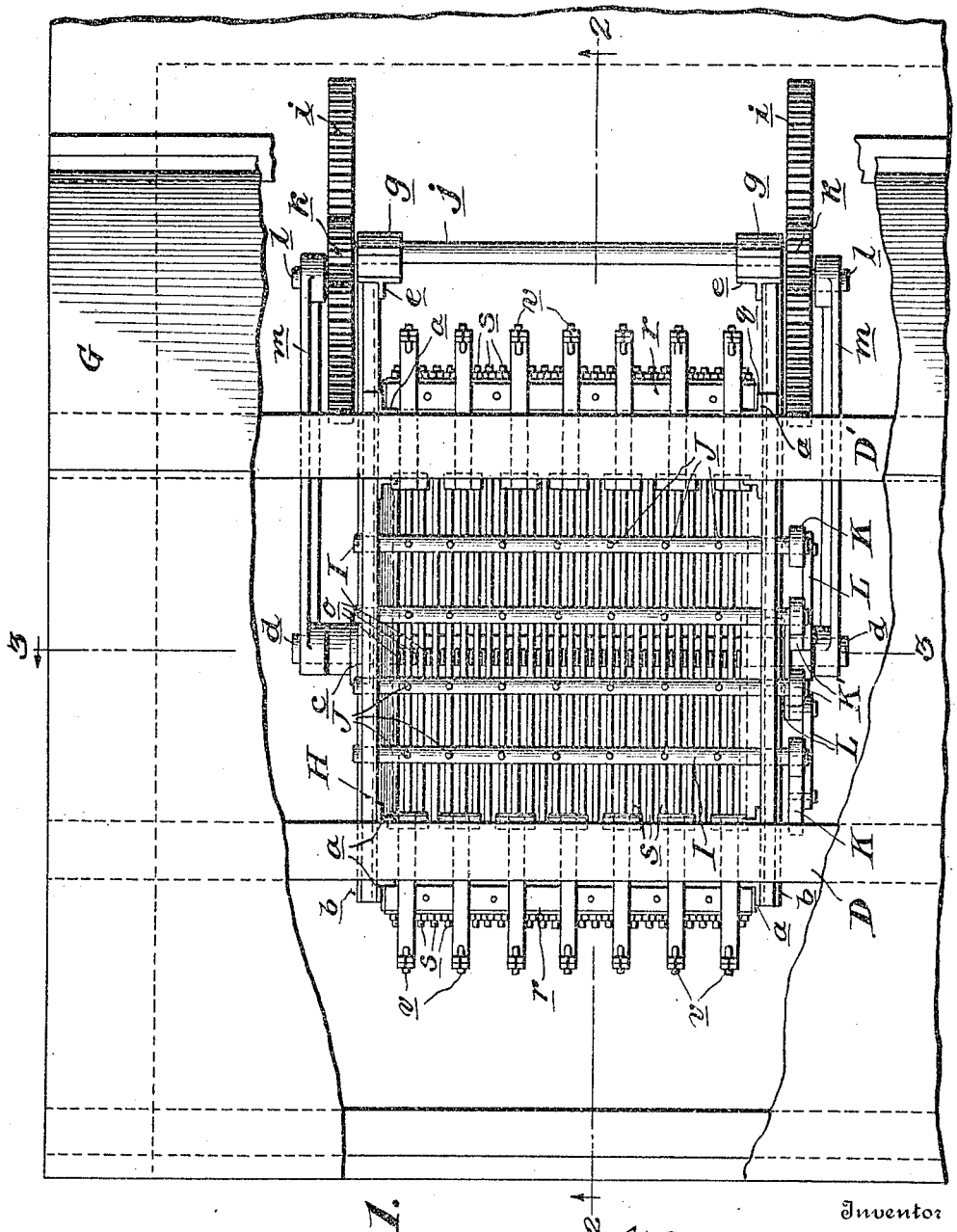

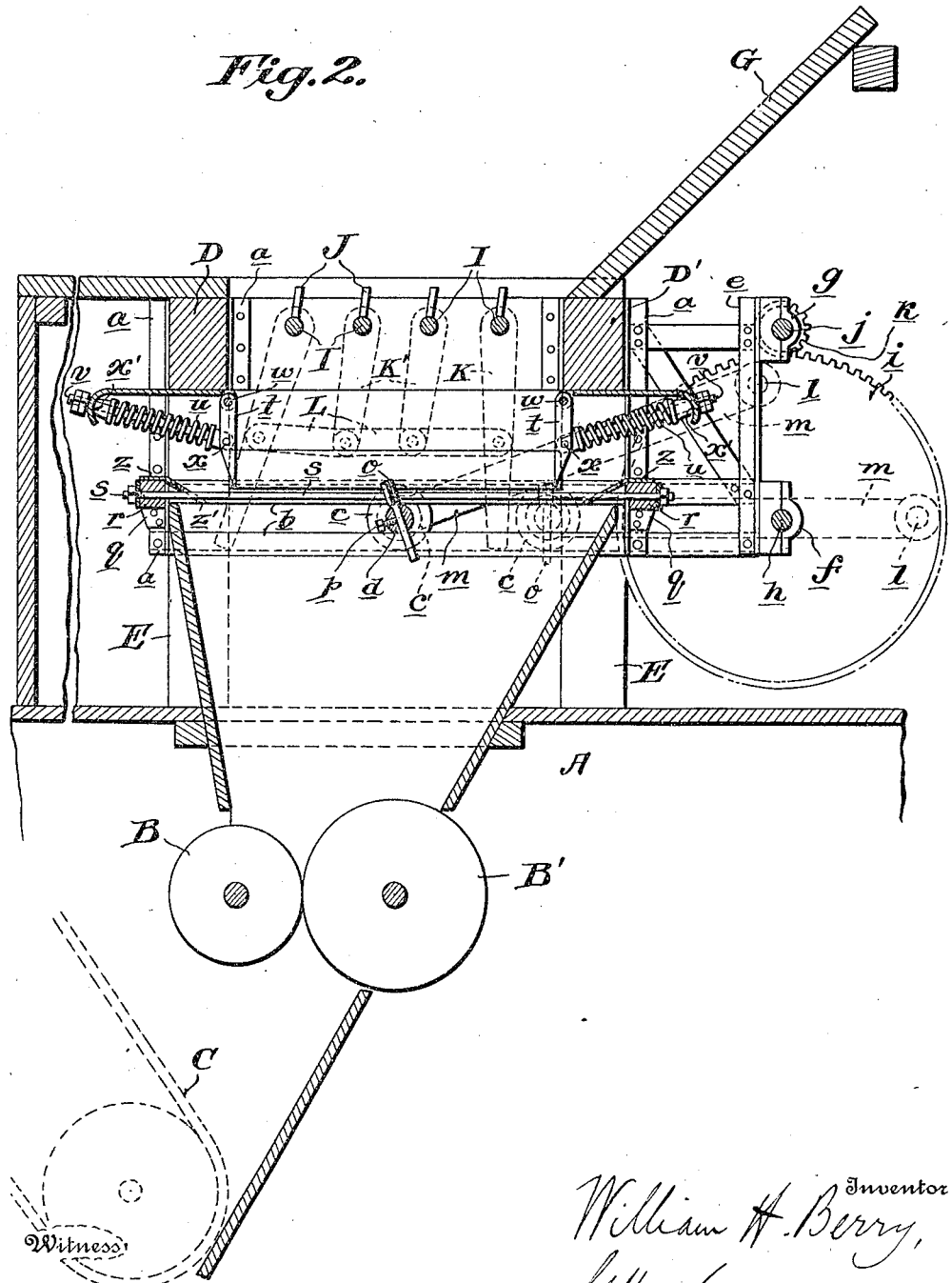

W. H. BERRY.
PULVERIZING AND SEPARATING MACHINE.
APPLICATION FILED OCT. 11, 1917.
1,292,686.
Patented Jan. 28, 1919.
5 SHEETS—SHEET 3.
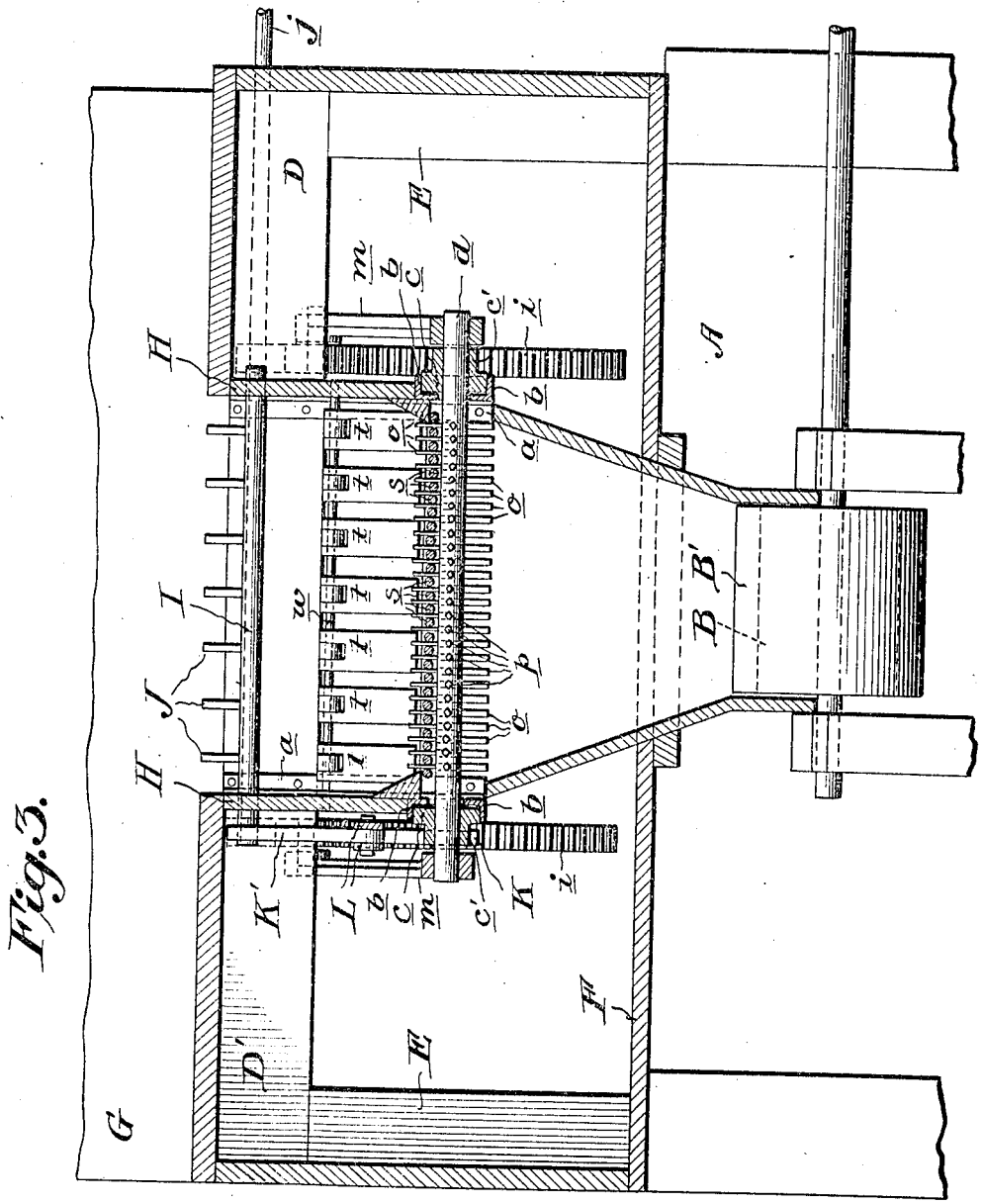

W. H. BERRY.
PULVERIZING AND SEPARATING MACHINE.
APPLICATION FILED OCT. 11, 1917.
1,292,686.
Patented Jan. 28, 1919.
5 SHEETS—SHEET 4.
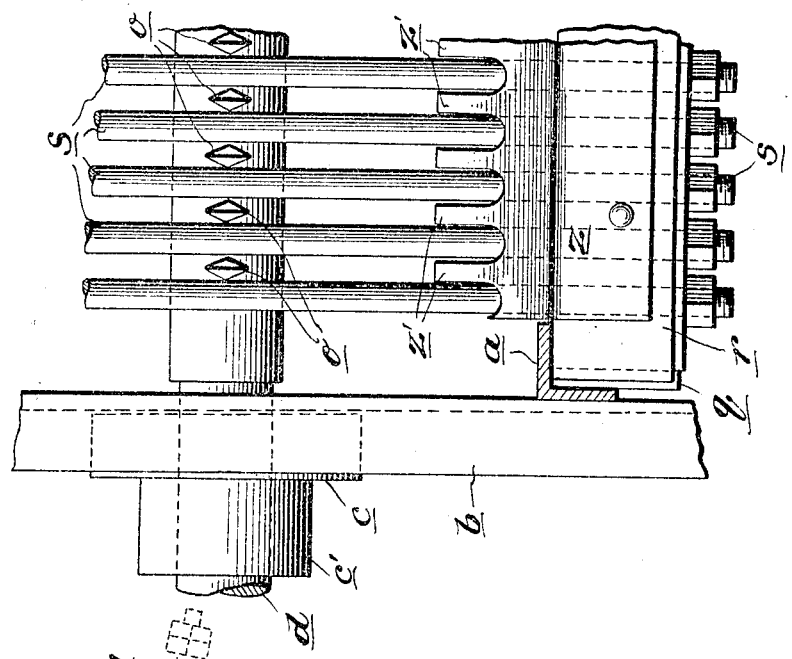
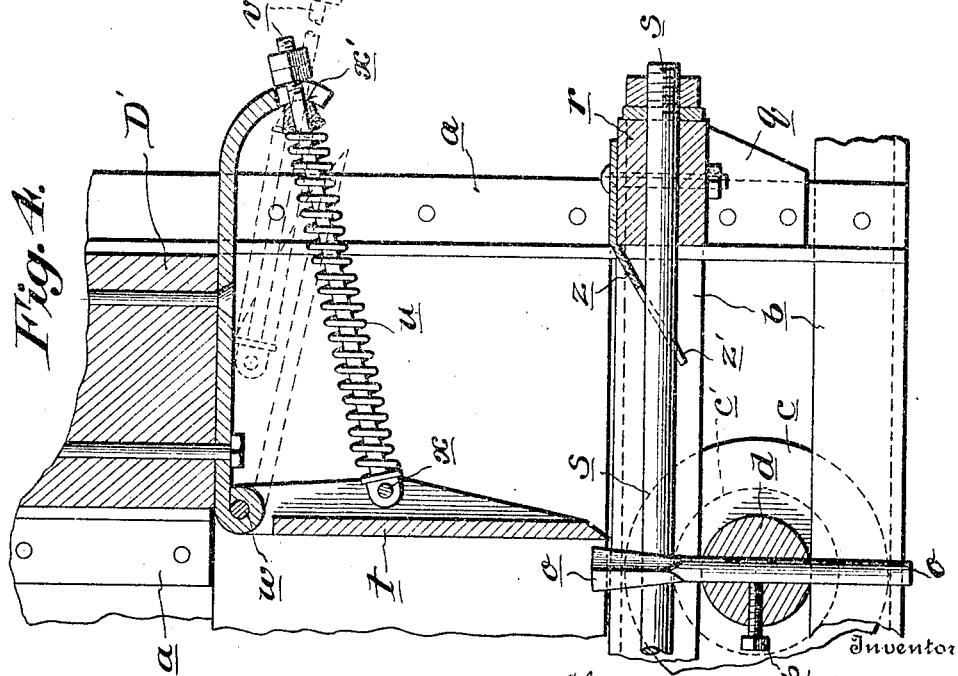

W. H. BERRY.
PULVERIZING AND SEPARATING MACHINE.
APPLICATION FILED OCT. 11, 1917.

1,292,686.

Patented Jan. 28, 1919.
5 SHEETS—SHEET 5.

Inventor
William H. Berry,
By
Attorneys

Witness:
Chas. L. Griesbauer.

UNITED STATES PATENT OFFICE.

WILLIAM H. BERRY, OF CHESTER, PENNSYLVANIA.

PULVERIZING AND SEPARATING MACHINE.

1,292,686.      Specification of Letters Patent.    Patented Jan. 28, 1919.

Application filed October 11, 1917. Serial No. 196,015.

*To all whom it may concern:*

Be it known that I, WILLIAM H. BERRY, a citizen of the United States, residing at Chester, in the county of Delaware and State of Pennsylvania, have invented new and useful Improvements in Pulverizing and Separating Machines, of which the following is a specification.

The invention relates to that class of machines by which clay, dug from a bank and containing lumps of varying sizes together with roots and stones, or by which other heterogeneous material is mechanically treated to disintegrate the lumps, and remove the roots and stones or other irreducible content, and prepare it for making bricks or similar ware, or for other purposes.

The main object of my invention is to provide a simple and durable machine for the above purposes to which a heterogeneous mass of clay or other material may be delivered in cart or car loads, and from which the clay or other material shall be discharged in a controllably steady stream and in a homogeneous condition, free from roots, stones, or other irreducible matter, to puddling and molding machines, or to other destinations. Other objects and advantages are hereinafter referred to.

The machine, as applied to the preparation of clay, is at once a disintegrator, a stone and root separator, and a feeder.

Figure 6:
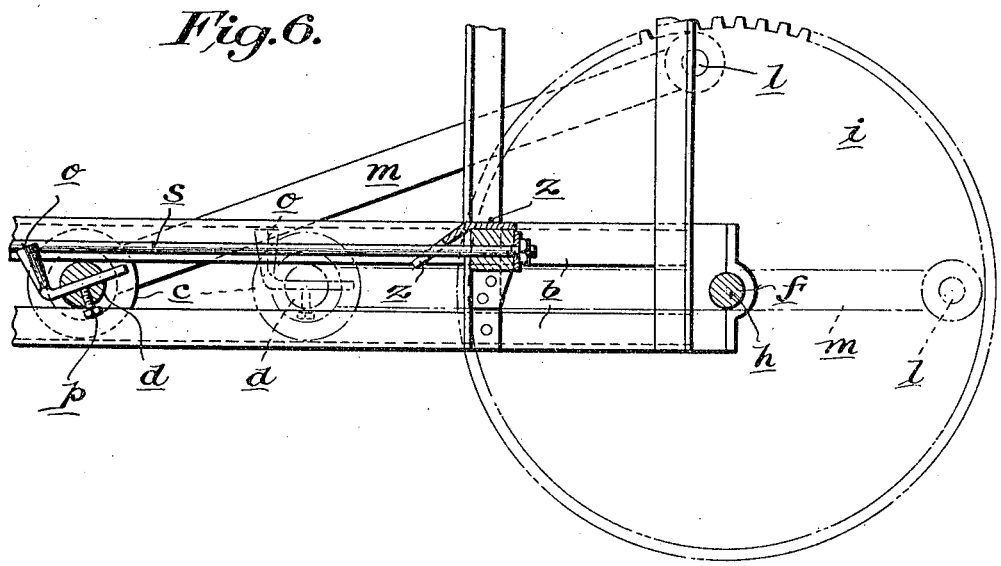
Figure 7:
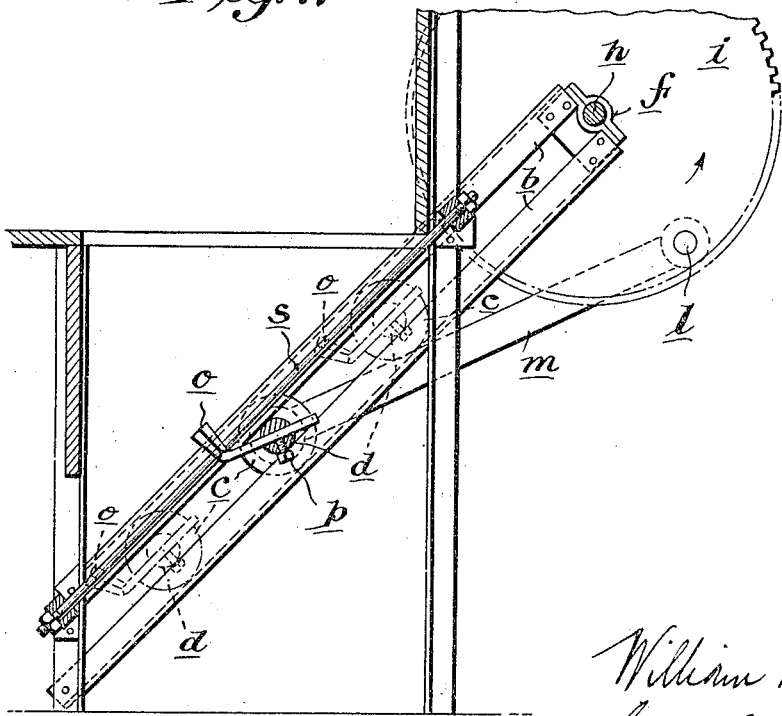

In the accompanying drawings, Figure 1 is a plan with a portion of the covering floor removed to show the working parts. Fig. 2 is a vertical section on the line 2—2 of Fig. 1. Fig. 3 is a vertical section on the line 3—3 of Fig. 1. Figs. 4 and 5 are enlarged details. Figs. 6 and 7 show modifications hereinafter described.

The machine may be mounted in various ways to suit diversified conditions, the drawings showing it in a form usual about a clay-working plant.

A is a pit in which the roll crusher, shown diagrammatically by B, B', is mounted in a usual way indicated in Figs. 1, 2 and 3, and provided with an elevator C for carrying the pulverized clay to the molding machines. This elevator, being of conventional character, is shown in Fig. 2 by dotted lines.

Spanning the crusher-pit A are two beams D, D' supported at a suitable distance above the crusher-rolls B and B' by the posts or legs E. The pit A is covered with a loose floor or working stage F, and a heavy floor G is laid upon the beams D, D', leaving a square or rectangular opening to receive the dumping of the rough clay over the screen bars.

Suspended from the beams D, D', shown enlarged in Figs. 4 and 5, are four vertical angle bars $a$, to which four horizontal angle bars $b$ are bolted so as to form with their projecting flanges a guide or runway for the rollers $c$ which are journaled loosely on and near the ends of the shaft or rake-head $d$. At the projecting ends of the angle bars $b$ are provided the vertical T-bars $e$ (Figs. 1 and 2) to which the boxes $f$ and $g$ are bolted. Journaled in the boxes $f$ is the shaft $h$ on the projecting ends of which are keyed the spur gears $i$, Figs. 1 and 3. In the boxes $g$ is journaled the shaft $j$ through which the power is communicated by means of a friction pulley or other controllable appliance to the spur pinions $k$ and the spur gears $i$, Fig. 2. The spur gears $i$ have wrist-pins $l$ set opposite and in line with each other, Figs. 1 and 2. From the wrist-pins $l$ connecting rods or bars $m$ extend to the projecting ends of the shaft or rake-head $d$, and are keyed fast to the shaft $d$, in order that when the spur gears $i$ revolve, the shaft or rake-head $d$ will travel through a stroke equal to twice the distance of the wrist-pins $l$ from the center of the spur gears $i$, and at the same time oscillate on its axis from the vertical, as shown in dotted lines in Fig. 2, to the angle shown in full lines in the same figure.

In the shaft or rake-head $d$ are drilled a series of holes, spaced at a suitable distance apart to receive the rake teeth or knives $o$, Figs. 1 and 3, and seen enlarged in Figs. 4 and 5. The knives or teeth $o$ are made of round stock, and flattened at their upper projecting ends, the round portions being adjustably held in position by the set screws $p$, Figs. 2 and 4.

Extending across the machine in parallel relation to the shaft $d$, and supported by the brackets $q$, Fig. 2, are the flat bars $r$, Figs. 4 and 5, each having one edge bearing against the flange of a vertical angle $a$. Between these bars $r$ at each end of the machine, the round screen bars $s$, shown assembled in Figs. 1 and 2, and enlarged in the fragmentary views Figs. 4 and 5, extend at right angles to and above the shaft $d$. The bars $s$ are furnished with nuts to keep them taut. The teeth or knives $o$ reach upward between the bars s and, as the rake-head d moves back and forth, serve to keep the openings clear and cut the clods.

Suspended on pivots w (Figs. 2 and 4) from the beams D, D' at their lower inner edges, are the swinging doors t (Figs. 2, 3 and 4) having their lower ends a short distance above the bars s, and so located when in normal position that the teeth or knives o will just strike them at the end of the stroke when the teeth o are in a vertical position (Fig. 4.) and tend to force the stones out under the doors t. An inclined plate z (Figs. 2, 4 and 5) is formed into a comb with teeth z' entering between the bars s to facilitate the passage of the refuse matter over the bars r into the waste.

The doors t (Figs. 2 and 4) are under the control of the springs u on the rods v which are pivoted at x and x' so as to allow said doors to swing away from the knives o and permit a stone or root to escape under a door. Fig. 4 shows this spring and its adjuncts in detail. The pivots are arranged to maintain substantially the same stress on the doors in all positions, and with sufficient resistance to crush or cut a clod. When swung all the way back the doors t stand locked open as indicated in dotted lines in Fig. 4. The sides of the machine are covered by boards H which, with the doors t and the beams D and D', form a rectangular receptacle into which the clay is dumped.

Across the top of this receptacle and slightly below the floor, are placed heavy rocking bars I, Figs. 1, 2 and 3. The function of these bars is, first, to assist in supporting the surplus clay which may be piled high upon the platform; and, secondly, by reason of the projecting fingers J with which they are furnished, to tend, when the bars I are oscillated, to break up a possible bridging of the clay above them. The bars I are provided with levers K (Figs. 1 and 2) connected by the links L so as to move in unison. The lower end of each of the coupled levers K is long enough to be engaged, alternately, by the projecting hub c' of the roller c on the rake-head d and thus oscillate the bars I.

Motion is given to the shaft j through controllable mechanism and communicated through pinions k to the spur gears i. The rake-head d is thus made to travel back and forth under the screen bars s and to oscillate on its axis so as to cause the teeth or knives o to advance in a backwardly inclined position. This tends to force the small pebbles up from between the bars s, and insure the removal of a larger portion of them under the doors t. At each end of the stroke the knives o are in vertical position when they meet the doors t.

The constant movement of the rake-head d pulverizes the clay above the bars s, and it falls through the openings which are kept clear by the teeth, being guided to the roll-crusher which reduces the small pebbles to powder. The refuse material is forced out over the ends of the screen and disposed of in any suitable manner.

The application of an agitator projected through the screen from the side opposite that upon which the crude material rests, makes possible the constant agitation of a thin stratum resting immediately upon the screen bars and held comparatively rigid by the weight above it. The agitating teeth also keep the openings clear, and this insures the immediate voiding of the finished product by gravity as fast as it is reduced to the desired size.

From the foregoing it will be undertsood that among the more important points in my invention are the following: Means for operating the teeth or knives o from the side of the screen opposite to that upon which the material to be treated is placed upon the bars or rods s, so that the material may escape freely through the screen as fast as it is reduced; means whereby the teeth or knives carried by the rake-head d are oscillated and moved in the direction of the length of the bars or rods s, whereby the reducible material is pulverized and ejected by gravity while the irreducible content is carried to one or the other end of the screen: the giving of a backward inclination to the teeth or knives o with respect to their forward movement, whereby the tendency to draw the material through the openings prematurely is overcome: the means provided for moving the teeth or knives at governed speeds to the end that while the crude material may be dumped into the receptacle at irregular intervals, the finished product is delivered in a constant stream of controllable volume: the construction and arrangement of the rocking bars I and their fingers J acting to support the surplus clay piled upon the platform, whereby the weight of such superposed clay is practically supported and bridging prevented: and the arrangement of what may be termed the flexible doors t, they being located at and forming a part of one or both ends of the rectangular receptacle into which the rough clay is dropped, in such manner that the egress of reducible material shall be resisted sufficiently to insure its reduction, and the escape of stone or other irreducible content permitted.

The principle underlying my invention is applicable to screens of any desired mesh; and each bar, rod, or wire being separately held in tension by adjustable means, can be kept taut, or replaced with ease. The gradual forcing of the irreducible content to one end or the other of the screen, and its ejection under the spring doors, will occur in any case.

The gradual and constant forcing of the irreducible content to one end or the other of the screen, and its ejection under the spring doors, is accomplished with a minimum of power and a negligible amount of wear. The backward inclination of the advancing knives or teeth insures that the material shall not be crowded through the screen until it is fine enough to fall through easily. Other means for agitating the material may be used, such as toothed disks, or reciprocating knives placed at intervals along the length of the screen and operated to push the stones, etc., always in one direction, and deliver them to the spring gates at one end of the screen instead of both. I do not confine myself to the rake-head mechanism shown in the drawings as moving back and forth; but contemplate the use of other forms of agitator, projecting, however, between the screen bars into the material, and actuated to push the stones, etc., to one or the other end of the receptacle, to suit varying conditions. The oscillating and reciprocating rake-head shown is preferable in many cases on account of its simplicity of construction, effective operation, and the small amount of power required to operate it.

I have shown the knives or teeth o, carried by the rake-head, projecting practically at right angles through the screen when the wrist-pins l are on the center at each end of the stroke. This gives the backward inclination of the advancing teeth in both directions, and the delivery of the irreducible material at both ends of the screen. I do not, however, confine myself to this relation. Thus the teeth may be put through the rake-head in a direction parallel to the rods in the screen, and bent up to project through the screen at their cutting ends as shown in Fig. 6, in which case the teeth will be projected through the screen at one end of the stroke, and carried along with a gradually increasing projection to the center, and a gradually decreasing projection to the other end of the stroke, and upon the return stroke will be withdrawn from the screen and carried to the other end free of contact. The teeth will thus be most nearly perpendicular to the screen bars at the center of the stroke, and have a more pronounced backward inclination while approaching and receding from the center. By this arrangement the irreducible material will be carried to one end of the screen only.

Nor do I confine myself to a screen in a horizontal position, as it may be desirable to set it at an angle, or even vertical, for the convenience of operation. Thus Fig. 7 shows the screen on an angle of forty-five degrees, with the teeth inserted in the rake-head at a right angle to the position shown in the other figures, and bent up at one end to project through the screen. In this arrangement, with the crank-shaft revolving in the direction of the arrow, the teeth are introduced into the material at the lower end of the stroke, and cut while moving to the top, where they are withdrawn and returned to the bottom free of contact with the material. In this case, the irreducible material is forced upward and away from the screen and gradually falls to the bottom, where it is removed at intervals. It is obvious that with the teeth projecting in the opposite direction and the revolution of the crankshaft in the same direction, the teeth will be inserted in the material at the top of the screen, and will cut while moving to the bottom, to be withdrawn while moving to the top.

Having thus described my invention, I claim:—

1. In a pulverizing machine, a screen composed of a series of parallel rods or bars adjustably supported at their ends, and forming one side of a box or receptacle, combined with a series of teeth or knives projecting into the material through the spaces between the rods or bars, said knives or teeth being operated at varying angles throughout the stroke by suitable means from the side of the screen opposite to that upon which the material to be treated rests, whereby the material may freely escape through the machine as fast as it is reduced.

2. In a pulverizing machine, a screen composed of a series of parallel rods or bars adjustably supported at their ends, and forming one side of a box or receptacle, combined with a series of knives or teeth projecting through the spaces between the rods, said knives or teeth being operated at varying angles throughout the stroke by suitable means from the side of the screen opposite to that upon which the material to be treated rests, and adapted to be moved in the direction of the length of the rods, whereby the irreducible content of the material is carried to one or the other end of the screen.

3. In a pulverizing machine, a screen composed of a series of parallel rods or bars adjustably supported at their ends, and forming one side of a box or receptacle, combined with a series of knives or teeth projecting through the spaces between the rods and operated at varying angles throughout the stroke in the direction of the length of the rods by suitable means located on the side of the screen opposite to that upon which the material to be treated rests, said knives being given a backward inclination with respect to their forward movement, whereby the tendency to draw the material through the openings prematurely is overcome.

4. In a pulverizing machine, a screen composed of parallel rods or bars adjustably supported at their ends, and forming one side of a box or receptacle, combined with a series of knives or teeth projecting through the spaces between the rods, and operated at varying angles throughout the stroke in the direction of the length of the rods by a shaft or rake-head located on the side of the screen opposite to that upon which the material to be treated rests, and to which rake-head the knives are adjustably attached, said rake-head with its accompanying knives or teeth being alternately moved by suitable means from one end of the receptacle to the other, whereby the reducible material is pulverized and ejected, and the irreducible content is carried to the ends of the receptacle.

5. In a pulverizing machine, a screen composed of a series of parallel rods or bars adjustably supported at their ends and forming one side of a box or receptacle, combined with a series of knives or teeth projecting through the spaces between the rods, and operated at varying angles throughout the stroke in the direction of the length of the rods by a shaft or rake-head located on the side of the screen opposite to that upon which the material to be treated rests, and to which the knives or teeth are adjustably secured, said rake-head with its accompanying knives or teeth being alternately moved by suitable means from one end of the receptacle to the other, and oscillated upon its axis so as to backwardly incline the knives or teeth with reference to their forward movement, whereby the reducible material is pulverized and ejected entirely by gravity, while the irreducible content is carried to the ends of the screen.

6. In a pulverizing machine, a screen composed of a series of parallel bars or rods adjustably supported at their ends, and forming one side of a box or receptacle, a series of knives or teeth projecting through the spaces between the rods, and means for moving the knives at varying angles throughout the stroke toward one or both ends of the screen, combined with flexible doors located at and forming a portion of one or both ends of the receptacle, whereby the egress or reducible material is sufficiently resisted to insure its reduction, and the escape of stone or other irreducible content is permitted.

7. In a pulverizing machine, a screen composed of a series of parallel bars or rods adjustably supported at their ends, and forming one side of a box or receptacle, a series of knives or teeth projecting through the openings between the bars or rods, means for moving the knives or teeth at varying angles throughout the stroke toward one or both ends of the receptacle, and flexible or yielding doors located at and forming a part of one or both ends of the receptacle, combined with a series of oscillating bars or rods located above the screen, and means for oscillating said bars, whereby the weight of the superimposed material is practically supported and bridging prevented.

8. In a pulverizing machine, a receptacle for crude material having one side composed of rods or bars in the form of a screen, teeth or knives projecting through the openings between the bars composing the screen, and means for moving the teeth at varying angles throughout the stroke through the material in the direction of the length of the screen bars, combined with means for moving the teeth at controllable speeds, whereby the crude material may be dumped into the receptacle at irregular intervals, and the finished product delivered in a constant stream of controllable volume.

In testimony whereof I affix my signature in presence of two witnesses.

WILLIAM H. BERRY.

Witnesses:
H. K. LATHY,
H. M. DAVIS.

Copies of this patent may be obtained for five cents each, by addressing the "Commissioner of Patents, Washington, D. C."